(12) United States Patent
Ou et al.

(10) Patent No.: US 11,087,061 B2
(45) Date of Patent: Aug. 10, 2021

(54) METHOD AND SYSTEM FOR IMPROVING PROPAGATION DELAY OF CONDUCTIVE LINE

(71) Applicant: TAIWAN SEMICONDUCTOR MANUFACTURING COMPANY LTD., Hsinchu (TW)

(72) Inventors: Hung-Chih Ou, Kaohsiung (TW); Wen-Hao Chen, Hsin-Chu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

(21) Appl. No.: 16/826,018

(22) Filed: Mar. 20, 2020

(65) Prior Publication Data

US 2021/0209281 A1     Jul. 8, 2021

Related U.S. Application Data

(60) Provisional application No. 62/956,507, filed on Jan. 2, 2020.

(51) Int. Cl.
| | |
|---|---|
| *G06F 30/392* | (2020.01) |
| *G06F 30/3953* | (2020.01) |
| *G06F 30/398* | (2020.01) |
| *G06F 30/3312* | (2020.01) |
| *G06F 119/12* | (2020.01) |

(52) U.S. Cl.
CPC ........ *G06F 30/392* (2020.01); *G06F 30/3312* (2020.01); *G06F 30/398* (2020.01); *G06F 30/3953* (2020.01); *G06F 2119/12* (2020.01)

(58) Field of Classification Search
USPC .......................................................... 716/110
See application file for complete search history.

(56) References Cited

U.S. PATENT DOCUMENTS

| | | | |
|---|---|---|---|
| 2007/0204255 A1* | 8/2007 | Narasimhan | G06F 30/394 716/113 |
| 2012/0025273 A1* | 2/2012 | Lu | G06F 30/30 257/211 |

\* cited by examiner

*Primary Examiner* — Bryce M Aisaka
(74) *Attorney, Agent, or Firm* — WPAT, P.C. Intellectual Property Attorneys; Anthony King

(57) ABSTRACT

A method, a non-transitory computer-readable storage medium and a system for a design layout are provided. The method includes: receiving a design layout including a first cell and a second cell; providing a conductive member electrically connected between the first cell and the second cell, the conductive member including a first conductive line and a second conductive line parallel to the first conductive line; determining a first merging point in the first conductive line between the first cell and the second cell; and electrically connecting the first conductive line to the second conductive line at the first merging point.

20 Claims, 12 Drawing Sheets

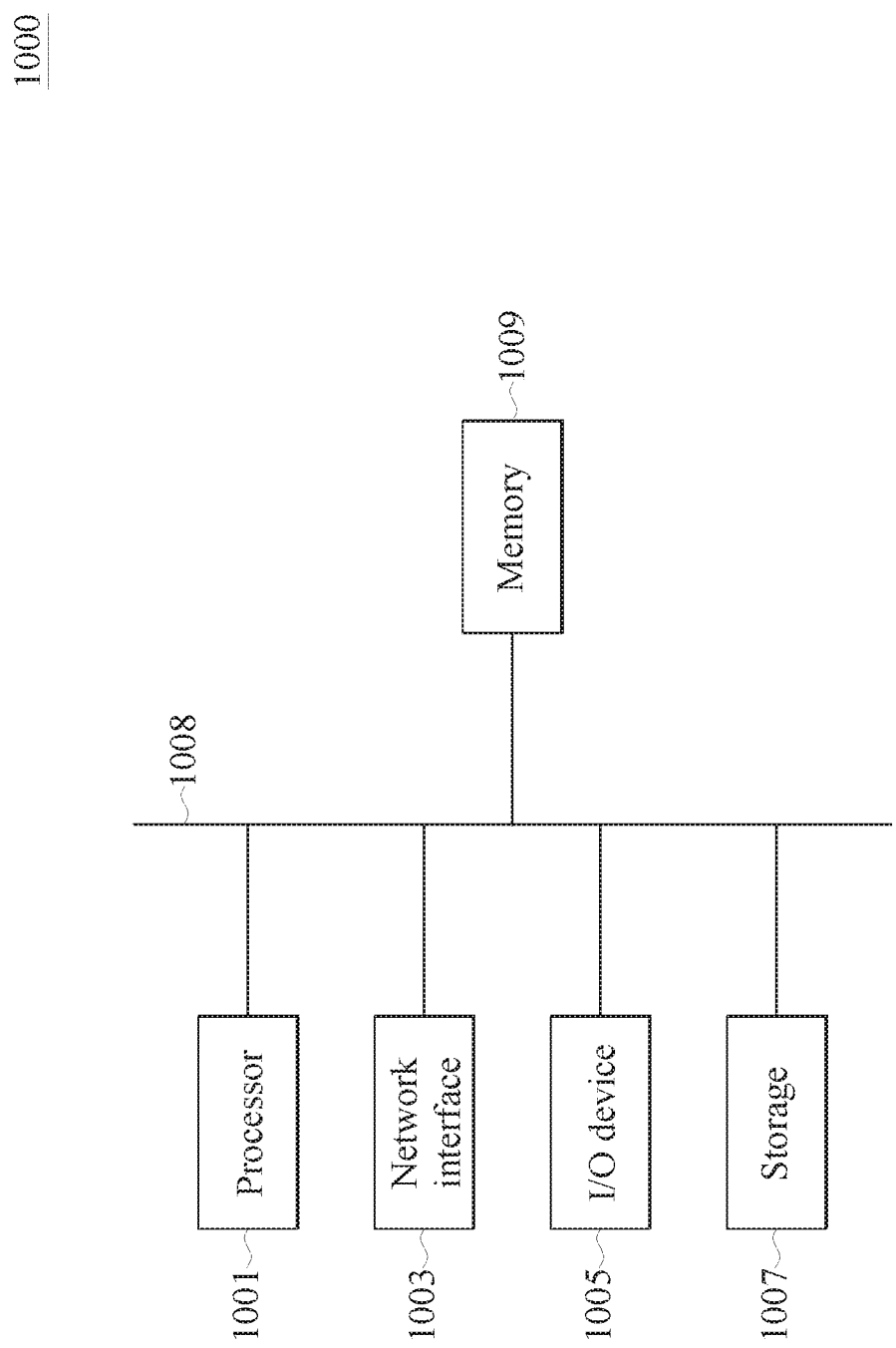

METHOD AND SYSTEM FOR IMPROVING PROPAGATION DELAY OF CONDUCTIVE LINE

PRIORITY CLAIM AND CROSS-REFERENCE

This application claims priority to U.S. Provisional Application No. 62/956,507 filed Jan. 2, 2020, the disclosure of which is hereby incorporated by reference in its entirety.

BACKGROUND

Electronic equipment involving semiconductive devices is essential for many modern applications. Technological advances in materials and design have produced generations of semiconductive devices, in which each generation has smaller and more complex circuits than the previous generation. In the course of advancement and innovation, functional density (i.e., the number of interconnected devices per chip area) has generally increased while geometric size (i.e., the smallest component that can be created using a fabrication process) has decreased. Such advances have increased the complexity of processing and manufacturing semiconductive devices. The manufacturing of a semiconductor device becomes more complicated in a miniaturized scale, and the increase in complexity of manufacturing may cause deficiencies such as high yield loss, reduced reliability of electrical interconnection and low testing coverage. Therefore, there is a continuous need to modify the structure and manufacturing method of the devices in electronic equipment in order to improve device robustness as well as reduce manufacturing cost and processing time.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 10 is a schematic diagram of a system for implementing layout design, in accordance with some embodiments.

DETAILED DESCRIPTION

Figure 1:
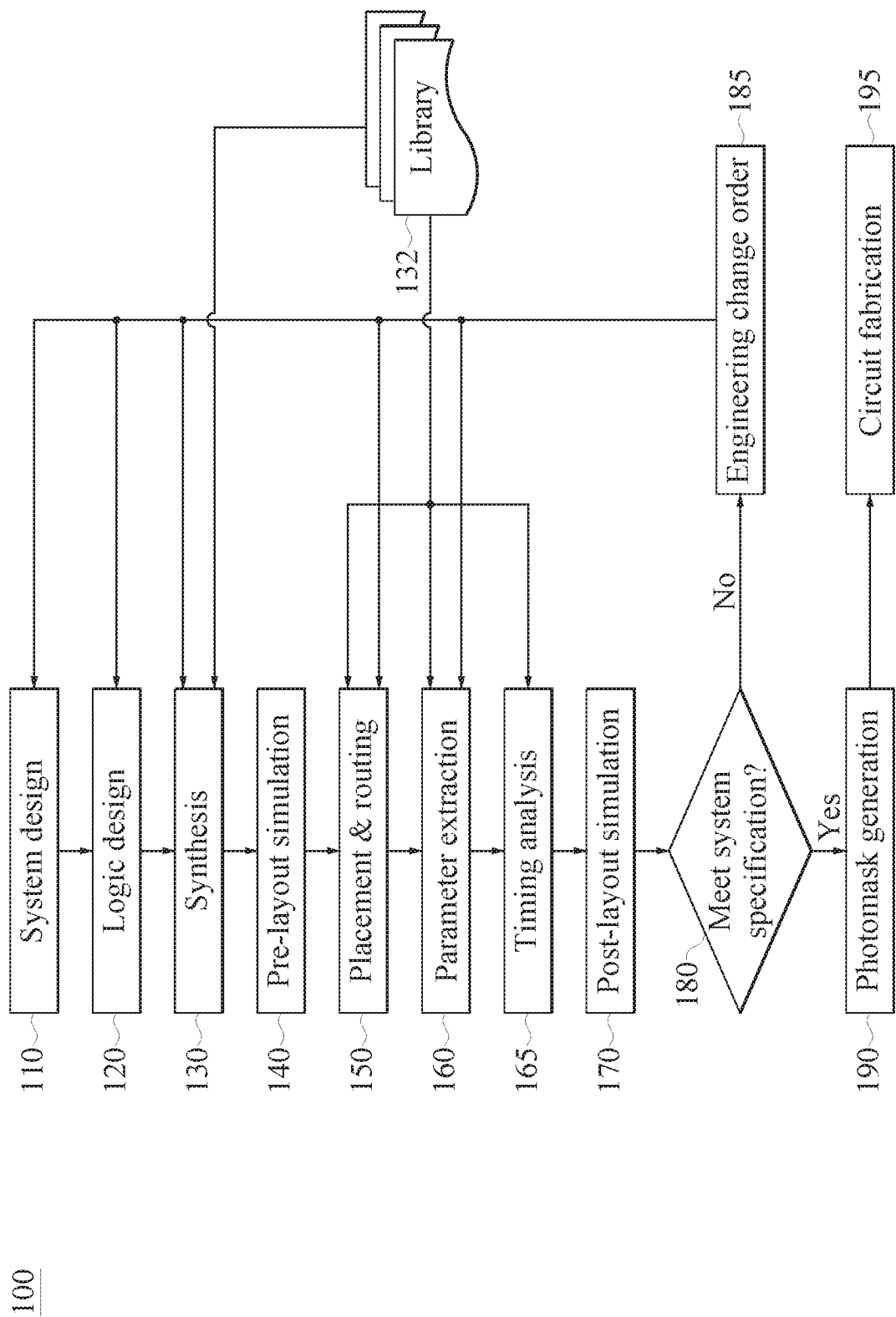
FIG. 1 is a schematic diagram illustrating a design flow of an electronic circuit, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof, disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

As will be appreciated by one skilled in the art, the embodiments of the present disclosure may be implemented as a system, method, or computer program product. Accordingly, the embodiments of the present disclosure may take the form of an embodiment comprised entirely of hardware, an embodiment comprised entirely of software (including firmware, resident software, micro-code, etc.) or an embodiment combining software and hardware aspects. The various types of embodiments mentioned may all generally be referred to herein as a "circuit," "block," "module" or "system." Furthermore, the embodiments of the present disclosure may take the form of a computer program embodied in any tangible medium of expression having program codes embodied in the medium and executable by a computer.

The term "cell" used throughout the present disclosure refers to a group of circuit patterns in a design layout to implement specific functionalities. A cell is comprised of various patterns and may be expressed as unions of polygons. A design layout may be initially constructed by an array of identical or different cells during the layout design stage. The input or output pins of a cell may be electrically connected to an adjacent cell through a conductive line to form an electronic circuit. A cell may include circuits corresponding to a portion or an entirety of a die to be manufactured, or a group of dies. A mask may be formed to implement the patterns of one or more cells and to transfer these cell patterns to a semiconductor substrate or wafer. The cell may include patterns of a transistor, an active area, a gate region, or the like.

The terms "couple" or "connect" used throughout the present disclosure refers to physical or electrical linkage between two or more objects. These objects may also be referred to as being "coupled" or "connected" through exchange of data or information. These "coupled" or "connected" objects may be in direct contact in some cases or indirect contact through other intervening objects.

The present disclosure relates generally to the subject of semiconductor devices and relates more particularly to design and manufacturing of conductive wires of the semiconductor device. In the design phase of an electronic circuit, two conductive lines may be aggregated to electrically connect two spaced cells of the design layout in order to decrease connection resistance between the cells. Since the capacitive effect arising due to the two conductive lines may also increase the capacitance of the conductive lines, and since such increased capacitance may contribute to a propagation delay, referred to as resistive-capacitive (RC) delay or RC time constant, of the conductive lines, a portion of one of the conductive lines is removed. The two conductive lines are merged in order to seek a balance between minimized resistance and minimized capacitance. The merging point is determined such that the RC delay is minimized.

FIG. 1 is a schematic diagram illustrating a design flow 100 of a semiconductor integrated circuit (IC), in accordance with some embodiments. The design flow 100, employed for designing electronic circuits in semiconductor ICs or chips, utilizes one or more electronic design automation (EDA) tools to perform design operations. A standalone computing device or a computing cluster, such as a workstation, a personal computer or a group thereof, is typically used in executing the method of the design flow 100. The design flow 100 includes a system design stage 110, a logic design stage 120, a synthesis stage 130, a pre-layout simulation stage 140, a placement and routing development stage 150, a parameter extraction stage 160, a timing analysis stage 165, a post-layout simulation stage 170, an engineering change order (ECO) stage 185, a photomask generation stage 190 and a circuit fabrication stage 195.

Initially, during the system design stage 110, a systematic architecture for the electronic circuit or chip of interest is provided with a high-level description. During the system design stage 110, the chip functions along with performance requirements are determined according to a design specification. The chip functions are usually represented by respective schematic functional modules or blocks. In addition, an optimization or performance trade-off may be sought to achieve the design specification at acceptable levels of cost and power.

During the logic design stage 120, the functional modules or blocks are described in a register transfer level (RTL) using a hardware description language. Commercially available language tools are generally used, such as Verilog or VHDL. In an embodiment, a preliminary functionality check is performed during the logic design stage 120 to verify whether the implemented functions conform to the specification set forth in the system design stage 110. In some embodiments, a timing verification is performed to determine whether the RTL-level circuit design complies with the specification.

Subsequently, during the synthesis stage 130, the modules in the RTL descriptions are converted into an instance of design data, e.g., netlist data, where the circuit structure, e.g., logic gates and registers, of each function module are established. In an embodiment, a library 132, e.g., a standard cell library, is provided to supply different classes of low-level circuits, i.e., standard cells, serving specific Boolean logic or sequential logic functions. In some embodiments, technology mapping of logic gates and registers to available cells in the standard cell libraries are conducted. Further, the design data or netlist data is provided to describe the functional relationship of the electronic circuit at a gate level. The library 132 may be provided by an IC designer, an IC manufacturing company, an EDA tool provider or any relevant third party. The library 132 also provides the parameters associated with each cell, such as the timing delays, powers, voltages, resistance, capacitance, and the like. In an embodiment, the netlist data is transformed from the gate-level view to a transistor-level view. In an embodiment, when the library is provided or updated (as will be described in subsequent paragraphs herein) and incorporated into the EDA tool, the IC designer can identify whether violations of the design rule (e.g., timing violations) occur and revise the original netlist data in response to the identified violations.

Subsequently, the gate-level netlist data is verified during the pre-layout simulation stage 140. If some functions fail the verification, the design flow 100 may be paused temporarily or may go back to the system design stage 110 or the logic design stage 120 for further modification. After the pre-layout simulation stage 140, the chip design has passed a preliminary verification and the front-end design process is completed. Next, a backend physical design process is conducted. In some embodiments, a timing verification is also performed to determine whether the synthesized netlist data complies with the specification.

During the placement and routing stage 150, a physical architecture representing the electronic circuit, determined during the front-end process, is implemented. Although not illustrated expressly, the layout development may include a floorplan stage in the beginning of or prior to the placement and routing stage 150. The floorplan stage is used for allotting spaces for major functional blocks in a two-dimensional circuit plane. Subsequently, the layout development involves a placement operation and a routing operation in sequence. Detailed structures and associated geometries for the components of the major blocks in the floorplan stage are determined in the placement operation. Interconnects among different components are routed subsequent to the placement operation. Both placement and routing operations are performed to meet the requirements of a design rule check (DRC) deck so that the manufacturing constraints of the chip are met. In an embodiment, a clock tree synthesis operation is performed at the placement and routing stage for a digital circuit in which clock generators and circuits are incorporated into the design. In an embodiment, a timing analysis or verification operation is performed to determine whether the tentative circuit arrangements meet the design specification, and a post-routing operation is performed subsequent to the preliminary routing operation in order to resolve timing issues discovered during the timing verification operation. Once the placement and routing stage 150 is completed, a placed-and-routed layout is created and a netlist along with data on placement and routing is generated accordingly.

During the parameter extraction stage 160, a layout parameter extraction (LPE) operation is conducted to derive layout-dependent parameters, such as parasitic resistance and capacitance, based on the layout developed in the placement and routing stage 150. As a result, post-layout netlist data, including the layout with the layout-dependent parameters, is generated.

Subsequently, a timing analysis or timing verification is performed during the timing analysis stage 165. The timing verification performed in the timing analysis stage 165 may be performed in accordance with the layout-dependent parameters extracted in the parameter extraction stage 160, and indicates the behavior of the circuit under the effects of parasitic resistance and capacitance. The library 132 may be involved in the timing analysis operation of the timing analysis stage 165.

During the post-layout simulation stage 170, a physical verification is performed, taking into consideration the parameters acquired in previous stages. A simulation of transistor-level behavior is conducted to examine whether the chip performance derived by the post-layout netlist meets the system specifications. In some embodiments, the post-layout simulation is performed to minimize probability of electrical issues or layout difficulties during the chip manufacturing process. In an embodiment, the library 132 is provided not only for the synthesis stage 130, but also for the pre-layout simulation stage 140, the placement and routing stage 150, the parameter extraction stage 160 and the post-layout simulation stage 170 so that the electrical or geometric parameters of the cells and other features listed in the library 132 can be leveraged to emulate the real-world behavior and performance of the electronic circuit throughout each stage of the design flow 100.

Next, in stage 180, it is determined whether the post-layout netlist meets the design specifications. If the result of the post-layout simulation is unfavorable, the design flow 100 loops back to previous stages for tuning functionalities or structures. For example, the design flow 100 may proceed with the ECO stage 185 for identifying or fixing the problem of the electronic circuit. The EDA tool or a designer would issue one or more engineering change orders (ECOs) in the ECO stage 185 to modify the design layout, in which the driving capability of one or more placed electrical devices are upgraded, or one or more routed lines are rearranged. In some embodiments, the ECOs include reassigning a segment of the selected routes to be formed by another patterning process. In some embodiments, after the ECO operation in the ECO stage 185, the design flow 100 loops back to the placement and routing stage 150 where the layout is re-developed to resolve issues from a physical perspective. In some embodiments, the design flow 100 proceeds with the parameter extraction stage 160 for performing parameter extraction based on the result of the ECO operation. Alternatively, the design flow 100 may retreat to an earlier stage, such as the system design stage 110 or the logic design stage 120, to recast the chip design from a functional level in case the problems cannot be resolved within the back-end process.

If the post-layout netlist passes the verification, the circuit design is accepted and then signed off accordingly. The electronic circuit is manufactured according to the accepted post-layout netlist. In an embodiment, during the photomask generation stage 190, at least one photomask is generated based on the verified post-layout netlist in the post-layout simulation stage 170. A photomask is a patterned mask used to allow a portion of radiation to pass through or reflect off the photomask while blocking or absorbing the remaining portions of the radiation in order to form a pattern of features on a light-sensitive layer, e.g., a photoresist layer, on a substrate. As a result, the patterns defined by the verified post-layout netlist are transferred to the photoresist layer. In some embodiments, a multi-layer layout netlist may require a set of photomasks in which the feature pattern in each layer is established in the corresponding photomask. Therefore, the patterns of the layout netlist formed on the photomasks are transferred to the light-sensitive layer through a lithography operation.

During the circuit fabrication stage 195, the circuit is fabricated on the substrate, e.g., a semiconductor wafer, using the patterns of the photomasks generated in the photomask generation stage 190. The fabrication may involve known semiconductor manufacturing operations, such as lithography, etching, ion implantation, deposition, and thermal treatment. In some embodiments, a testing operation may be utilized in an intermediate or final phase of the circuit fabrication stage 195 to ensure physical and functional integrity of the fabricated circuit. In some embodiments, a singulation operation may be used to separate the semiconductor wafer into individual circuit dies. The fabrication of the circuit is thus completed.

The design flow 100 illustrated in FIG. 1 is exemplary. Modifications to the above-mentioned stages, such as changes of order of the stages, partition of the stages, and deletion or addition of stages, are within the contemplated scope of the present disclosure.

Figure 2B:
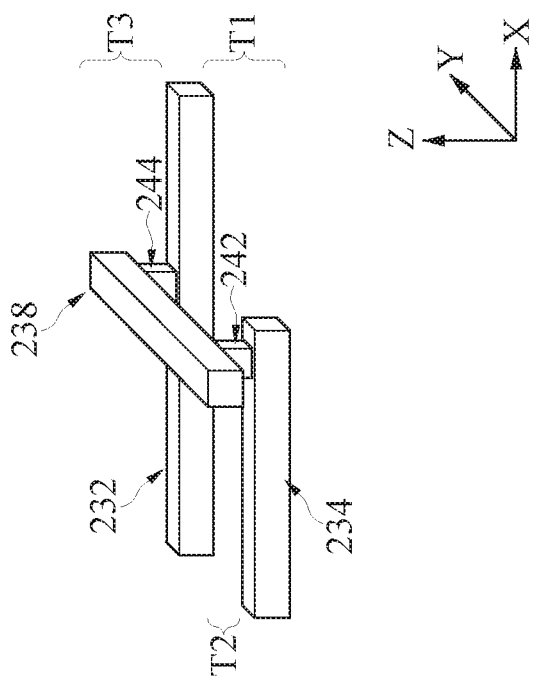
FIGS. 2A and 2B are a layout and a perspective view, respectively, of an electronic circuit, in accordance with some embodiments.
Figure 2A:
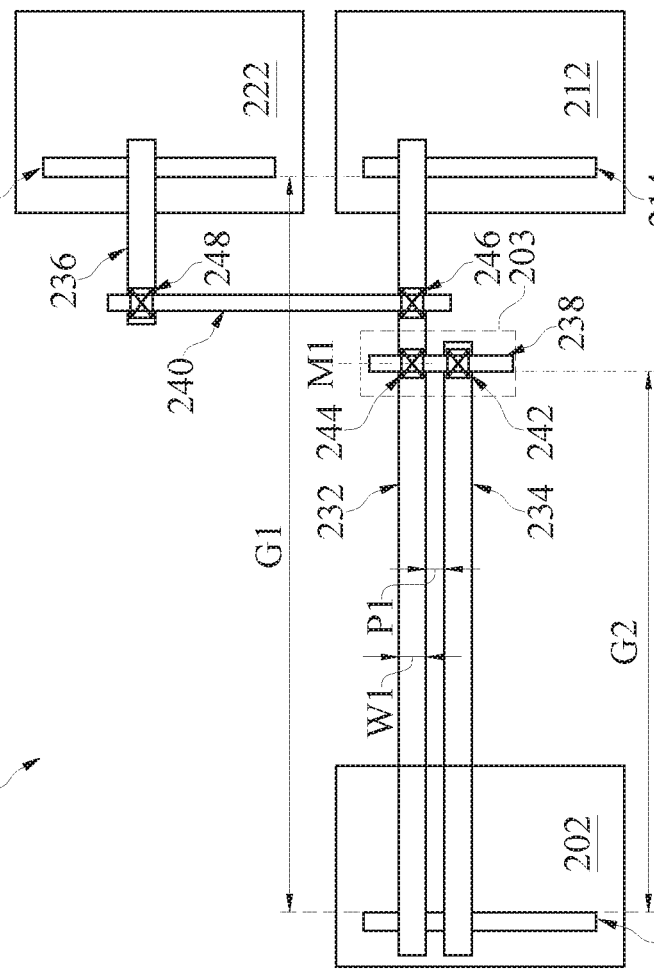

FIG. 2A is a schematic design layout 201 of an electronic circuit 200, in accordance with some embodiments. The design layout 201 may represent a portion of the electronic circuit 200. The design layout 201 may be first generated in the placement and routing stage 150 or may be alternatively represented by a schematic circuit diagram generated in the synthesis stage 130 and revised in later stages. The design layout 201 includes a first cell 202, a second cell 212, a third cell 222 and a conductive member 230. In some embodiments, the first cell 202 is electrically connected to the second cell 212 through the conductive member 230. In some embodiments, the first cell 202 is electrically connected to the third cell 222 through the conductive member 230. In some embodiments, first cell 202, the second cell 212 and the third cell 222 are formed in a first layer of the design layout 201, and the conductive member 230 is arranged in a second layer over the first layer.

The conductive member 230 may include one or more conductive lines extending in the x-axis direction or the y-axis direction. For example, the conductive member 230 includes a first conductive line 232, a second conductive line 234 and a third conductive line 236. The first conductive line 232, the second conductive line 234 and the third conductive line 236 are parallel to one another and to the x-axis. The conductive member 230 may further include a fourth conductive line 238 and a fifth conductive line 240 parallel to each other and to the y-axis. The conductive member 230, such as the constituent conductive lines 232, 234, 236, 238 and 240, may be formed of a conductive material when the electronic circuit 200 is manufactured according to the design layout 201. The conductive material may include titanium, titanium nitride, tantalum, tantalum nitride, copper, silver, aluminum, gold, tungsten, combinations thereof, or the like.

In some embodiments, the conductive lines 232, 234, 236, 238 and 240 are provided in allocated areas (referred to as "tracks") of a layout plane for the design layout 201, in which the locations and shapes of the tracks are predetermined, e.g., formed of strip lines with a line width W1 and a line pitch P1. The tracks can extend in the direction of the x-axis or the y-axis such that the conductive lines 232, 234, 236, 238 and 240 can be parallel to the x-axis or the y-axis. In some embodiments, the line width W1 and the line pitch P1 are included in the list of DRC deck so that the conductive lines 232, 234, 236, 238 and 240 are to be arranged with the respective width and pitch in compliance with the line width W1 and the line pitch P1.

In some embodiments, the first cell 202 includes an output pin 204 configured to provide an output signal and to transmit the output signal to the second cell 212 or the third cell 222. The output pin 204 may be a conductive line of the first cell 202 and may serve as a signal output. In some embodiments, the second cell 212 and the third cell 222 include input pins 214 and 224, respectively, configured to receive respective input signals from the first cell 202. The input pins 214 and 224 may be conductive lines of the second cell 212 and the third cell 222, respectively. In some embodiments, the conductive member 230 includes one or more conductive lines for electrically connecting two or more cells. For example, the first cell 202 is electrically connected to the third cell 222 through a single-line interconnection established by the first conductive line 232, the fifth conductive line 240 and the third conductive line 236. Further, the first cell 202 is electrically connected to the second cell 212 through a parallel-wiring interconnection established by the first conductive line 232, the second conductive line 234 and the fourth conductive line 238. The first conductive line 232 and the second conductive line 234 are electrically connected at a merging point M1 of the first conductive line 232 through the fourth conductive line 238. In some embodiments, the first conductive line 232 has a first length $G_1$ and the second conductive line 234 has a second length $G_2$ less than the first length $G_1$. In some embodiments, the merging point M1 corresponds to the second length $G_2$ and is aligned with the end point of the second conductive line 234. The second length $G_2$ is determined such that a partial parallel-wiring interconnection (PPI) scheme can seek a minimal value of the composite resistance-capacitance (RC) delay, or time constant, of the conductive member 230 between the first cell 202 and the second cell 212.

In some embodiments, electric current or signals flow from the first cell 202 to the second cell 212 and the third cell 222. The second conductive line 234 has a first end electrically connected to the first conductive line 232 at the merging point M1 and a second end connected to the first cell 202. In other words, the shortened second conductive line 234 is arranged to begin from the first cell 202 where current flows out. This arrangement may provide a resistance of the conductive member 230 that is lower than that if the second end of the shortened second conductive line 234 is connected to the second cell 212, according the Elmore delay model. The propagation delay of the conductive member 230 is thus decreased. In some embodiments, the conductive member 230 includes a non-uniform resistance distribution between the first cell 202 and the second cell 212 due to the shortened second conductive line 234. In some embodiments, the conductive member 230 has a first resistance R1 in a first segment S1 and a second resistance R2 in a second segment S2, in which the first segment S1 is closer to the first cell 202 than the second segment S2 is. The first resistance R1 may be less than the second resistance R2 through the arrangement of the second conductive line 234.

Existing methods of managing the problems of increased resistance of the conductive lines in the ever-shrinking semiconductor devices may adopt a parallel-wiring scheme in which the added parallel conductive line aids in doubling the current flow and decreasing the resistance between the connected cells. However, an accompanying capacitance may arise due to the additional capacitance coupled between the added conductive line and ground or other nearby conductive features. Therefore, the resultant propagation delay may not always be improved but instead may in some cases be exacerbated. The proposed adaptive PPI scheme provides the advantage of reducing the resistance of the interconnection while controlling the adverse impact of the incurred capacitance of the full parallel-wiring interconnection method by shortening the line to an appropriate length. The proposed adaptive PPI scheme also improves the electrical performance in terms of RC delay. Additionally, the reduced length of the added conductive line aids in conserving routing area to thereby reduce the footprint of the electronic circuit 200.

In some embodiments, the design layout 201 has several circuit planes stacked over one another for providing the features of the electronic circuit 200 in different layers or tiers, in which the conductive features in different layers are electrically interconnected. For example, the first conductive line 232 and the second conductive line 234 are provided in a same layer or different layers. FIG. 2B is a zoomed-in perspective view of a portion 203 of the design layout 201, which includes a neighborhood of the merging point M1 of the first conductive line 232. The first conductive line 232 and the second conductive line 234 may be provided in a first layer T1 and the fourth conductive line 238 may be provided in a third layer T3. Referring to FIGS. 2A and 2B, the conductive member 230 further includes a first conductive via 242 and a second conductive via 244 provided in a second layer T2 between the first layer T1 and the third layer T3. The first conductive line 232 is electrically connected to the fourth conductive line 238 through the first conductive via 242, and the second conductive line 234 is electrically connected to the fourth conductive line 238 through the second conductive via 244. In some embodiments, the configurations of the fourth conductive line 238, the first conductive via 242 and the second conductive via 244 provide the advantages of design flexibility and manufacturing reliability in electrically connecting the first conductive line 232 and the second conductive line 234. The first conductive via 242 and the second conductive via 244 may be formed of a conductive material when the electronic circuit 200 is manufactured according to the design layout 201. The conductive material may include titanium, titanium nitride, tantalum, tantalum nitride, copper, silver, aluminum, gold, tungsten, a combination thereof, or the like.

Similarly, the first conductive line 232 and the third conductive line 236 are electrically connected to the fifth conductive line 240 through a third conductive via 246 and a fourth conductive via 248, respectively. The configurations and materials of the third conductive via 246 and the fourth conductive via 248 are similar to those of the first conductive via 242 and the second conductive via 244; therefore, repeated descriptions are omitted for clarity.

Figure 3A:
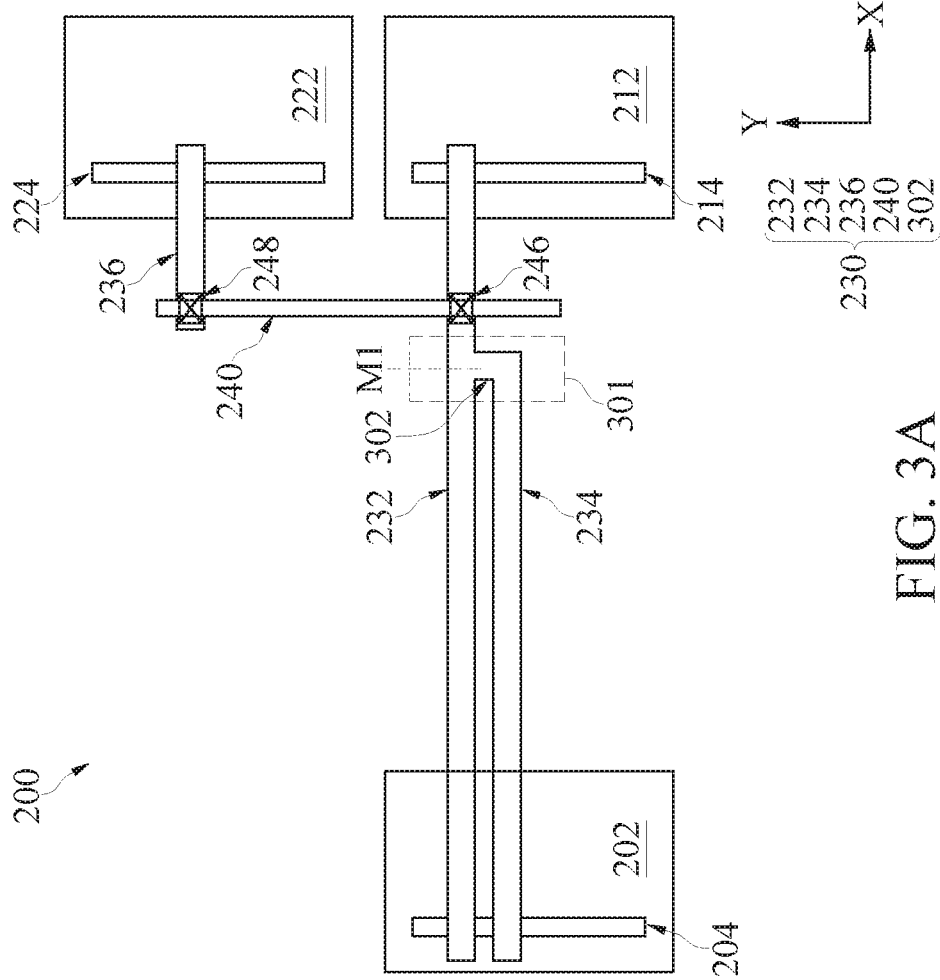
FIGS. 3A and 3B are a layout and a perspective view, respectively, of an electronic circuit, in accordance with some embodiments.

FIG. 3A is a design layout 301 of the electronic circuit 200, in accordance with some embodiments. Referring to FIG. 2A and FIG. 3A, the design layout 301 is similar to the design layout 201 in many aspects, except that, in FIG. 3A, the first conductive line 232 and the second conductive line 234 are electrically connected through a sixth conductive line 302. In some embodiments, the sixth conductive line 302 extends in the first layer T1 along a direction (e.g., the y-axis direction) substantially perpendicular to the direction (e.g., the x-axis direction) in which the first conductive line 232 and the second conductive line 234 extend.

Figure 3B:
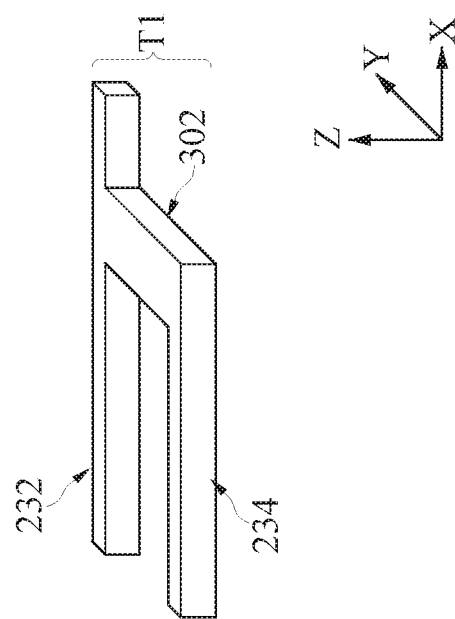

FIG. 3B is a zoomed-in perspective view of a portion 303 of the design layout 301, which includes a neighborhood of the merging point M1 of the first conductive line 232. The first conductive line 232, the second conductive line 234 and the sixth conductive line 302 may be provided in the first layer T1. In some embodiments, the configuration of the sixth conductive line 302 provides the advantages of conserving the routing resource and decreasing effective resistance as compared to the configuration of FIG. 2B. The sixth conductive line 302 may be formed of a conductive material when the electronic circuit 200 is manufactured according to the design layout 301. The conductive material may include titanium, titanium nitride, tantalum, tantalum nitride, copper, silver, aluminum, gold, tungsten, a combination thereof, or the like.

Figure 4A:
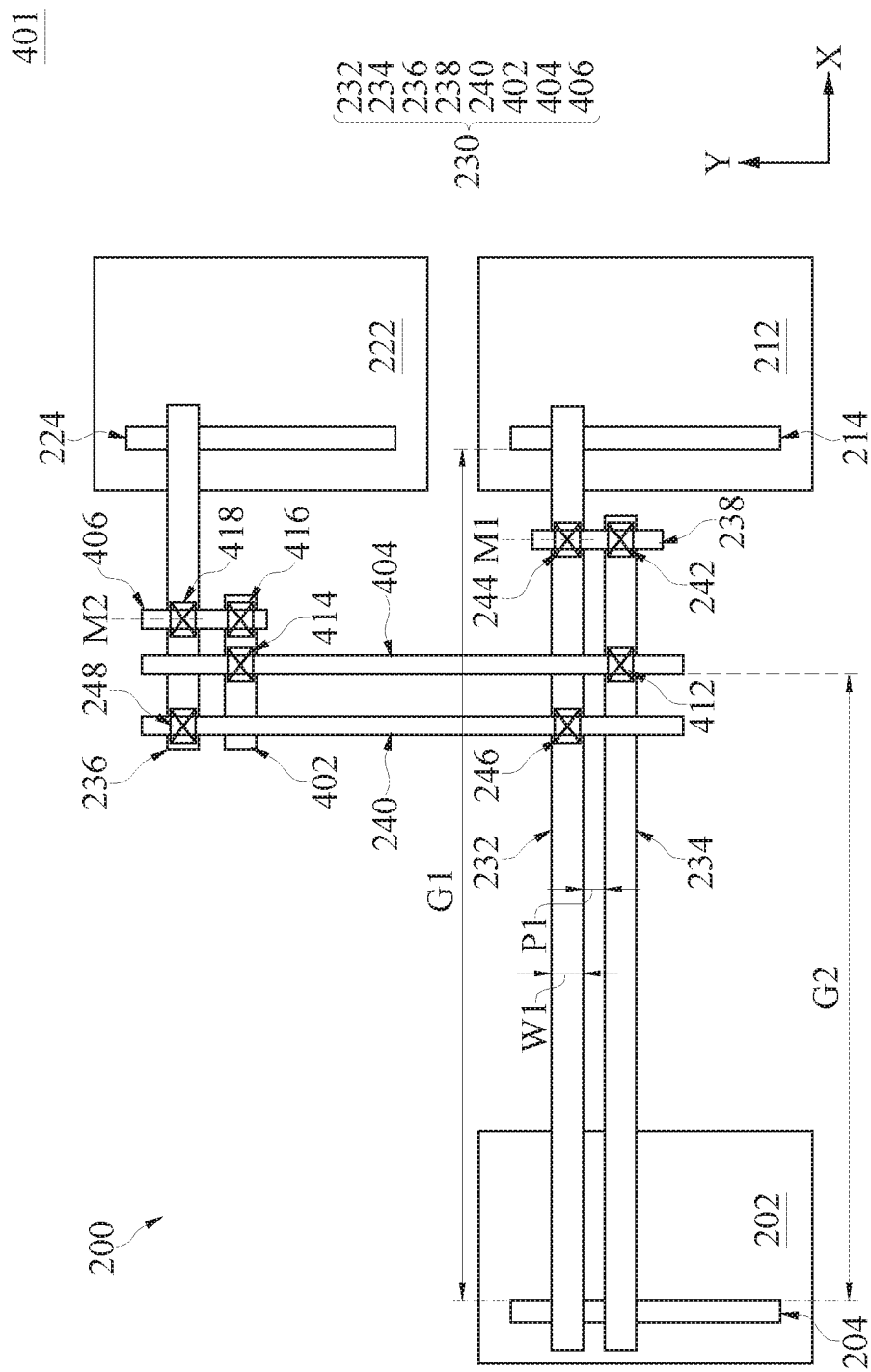
FIGS. 4A to 4C are layouts of an electronic circuit, in accordance with some embodiments.

FIG. 4A is a layout 401 of the electronic circuit 200, in accordance with some embodiments. Referring to FIG. 2A, the merging point M1 of the first conductive line 232 is between the first cell 202 and the third conductive via 246, and the first conductive line 232 is electrically connected to the third conductive line 236 through the fifth conductive line 240. In contrast, as illustrated in FIG. 4A, the merging point M1 of the first conductive line 232 is between the second cell 212 and the third conductive via 246, and the conductive member 230 further includes a seventh conductive line 402 parallel to the third conductive line 236. The conductive member 230 also includes an eighth conductive line 404 electrically connected between the second conductive line 234 and the seventh conductive line 402, and a ninth conductive line 406 electrically connected between the third conductive line 236 and the seventh conductive line 402.

The conductive member 230 further includes a fifth conductive via 412 electrically coupling the second conductive line 234 to the eighth conductive line 404, and a sixth conductive via 414 electrically coupling the eighth conductive line 404 to the seventh conductive line 402. The conductive member 230 additionally includes a seventh conductive via 416 electrically coupling the seventh conductive line 402 to the ninth conductive line 406, and an eighth conductive via 418 electrically coupling the ninth conductive line 406 to the third conductive line 236. The configurations and materials of the conductive lines 402, 404 and 406 and the conductive vias 412, 414, 416 and 418 are similar to those of the conductive lines 232, 234 and 236 and the conductive vias 242 and 244, and repeated descriptions thereof are omitted for clarity.

The fifth conductive line 240, the seventh conductive line 402, the eighth conductive line 404 and the ninth conductive line 406 comprise another parallel-wiring interconnection between the first cell 202 and the third cell 222 in combination with the first conductive line 232, the second conductive line 234 and the fourth conductive line 238. Additionally, the seventh conductive line 402, parallel to the third conductive line 236, includes a line length less than that of the third conductive line 236. The seventh conductive line 402 is electrically connected to the third conductive line 236 at a merging point M2 of the third conductive line 236. As a result, the PPI scheme as applied to the third conductive line 236 and the seventh conductive line 402 provides the advantage of a minimized RC delay between the first cell 202 and the third cell 222.

Figure 4B:
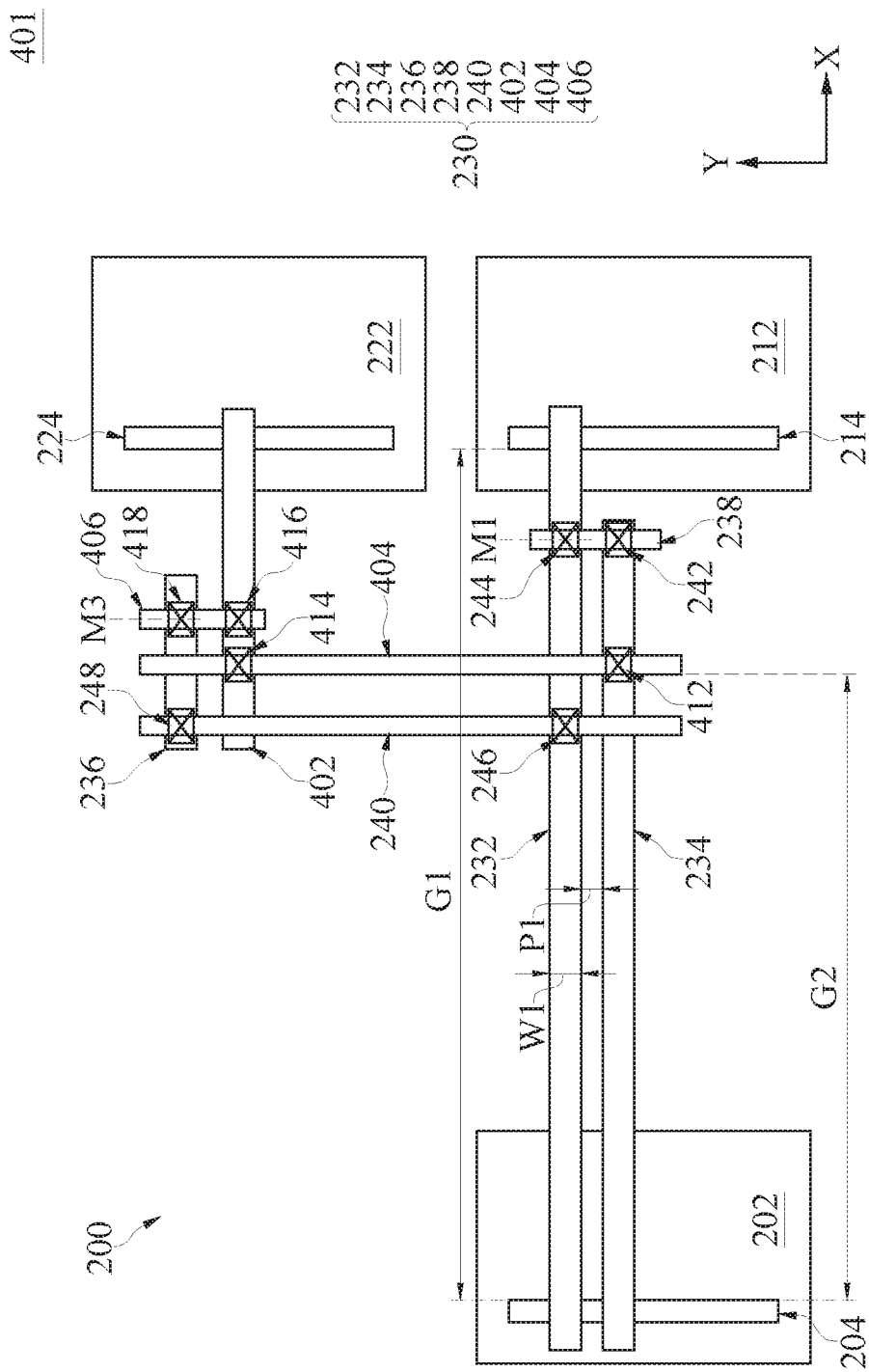

FIG. 4B is a layout 411 of the electronic circuit 200, in accordance with some embodiments. Referring to FIGS. 4A and 4B, the layout 411 is similar to the layout 401 in many aspects, except that in the layout 411 the roles of the third conductive line 236 and the ninth conductive line 406 are exchanged. In the layout 411, the seventh conductive line 406 is connected to the third cell 222, and the third conductive line 236 is electrically connected to the ninth conductive line 406 at a merging point M3 of the ninth conductive line 406. In some embodiments, in the layout 401 the shortened conductive lines 234 and 402 are directly coupled to each other through the conductive vias 412 and 414, while in the layout 411 the shortened second conductive line 234 is directly coupled to the non-shortened seventh conductive line 402 through the eighth conductive line 404 and the non-shortened first conductive line 232 is directly coupled to the shortened third conductive line 236 through the fifth conductive line 240.

Figure 4C:
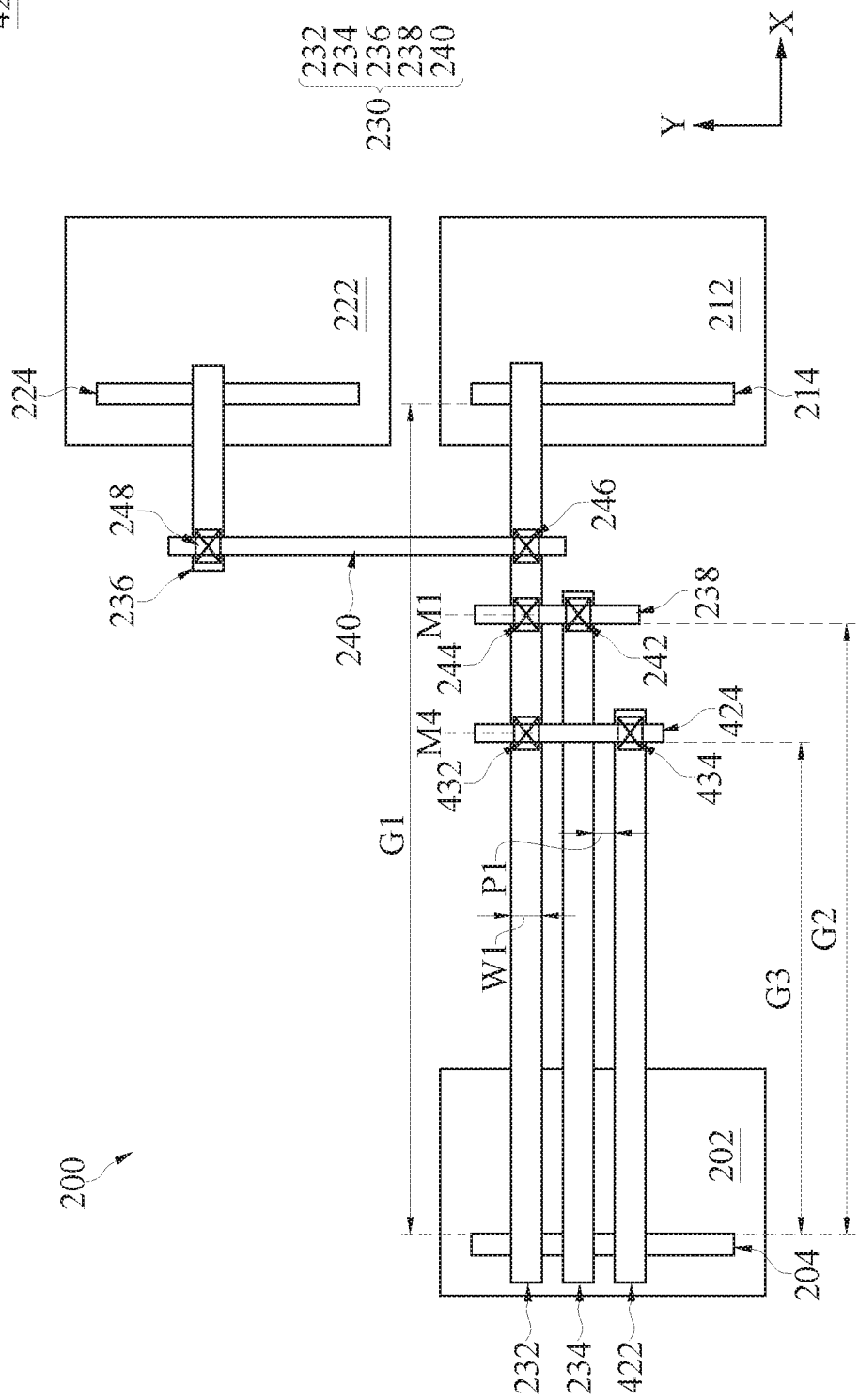

FIG. 4C is a layout 421 of the electronic circuit 200, in accordance with some embodiments. Referring to FIGS. 2A and 4C, in the layout 421 the conductive member 230 further includes a tenth conductive line 422 extending in the x-axis direction and parallel to the first conductive line 232 and the second conductive line 234. The conductive member 230 also includes an eleventh conductive line 424 extending in the y-axis direction and electrically coupled to the first conductive line 232 and the tenth conductive line 422 through a ninth conductive via 432 and a tenth conductive via 434, respectively. In some embodiments, the tenth conductive line 422 is configured as a shortened conductive line with a length $G_3$ and is electrically connected to the first conductive line 232 at a merging point M4 of the first conductive line 232. The tenth conductive line 422 may aid in further reducing the RC delay of the conductive member 230 between the first cell 202 and the second cell 212 through an appropriately-determined location of the merging point M4. In some embodiments, the merging point M4 is between the first cell 202 and the merging point M1, while, in other embodiments, the merging point may be arranged between the second cell 212 and the merging point M1. The tenth conductive line 422 can be regarded as a variant of the proposed PPI scheme, and other PPI configurations including multiple shortened conductive lines are also within the contemplated scope of the present disclosure.

Figure 5:
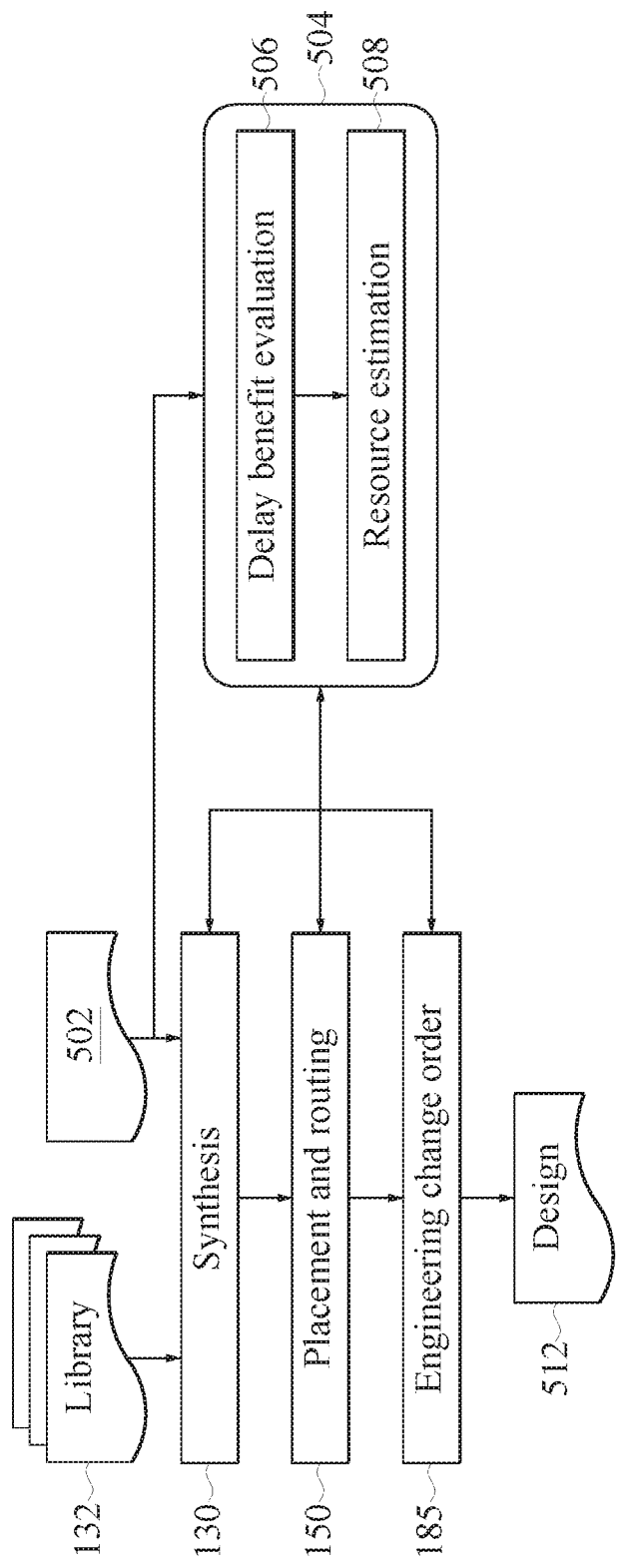
FIG. 5 is a schematic diagram illustrating a design flow of a conductive member, in accordance with some embodiments of the present disclosure.

FIG. 5 is a schematic diagram illustrating a design flow 500 of the conductive member 230, in accordance with some embodiments of the present disclosure. The design flow 500 is operated in combination with the design flow 100 in FIG. 1, in which a design layout 502 may be provided or generated by the logic design stage 120 in the design flow 100. The synthesis stage 130, the placement and routing stage 150 and the ECO stage 185 of the design flow 500 are similar to those discussed with reference to FIG. 1. In addition, the library 132 in the design flow 100 may provide standard cells and design library for the design flow 500.

Referring to FIG. 1 and FIG. 5, the design flow 500 further includes a PPI stage 504. The PPI stage 504 may receive the design layout 502 in any of the stages discussed with reference to FIG. 1 and may be configured to modify one or more of the conductive lines in the design layout according to the proposed PPI scheme. The design layout 502 modified by the PPI stage 504 can be sent to the synthesis stage 130, the placement and routing stage 150 or the ECO stage 185 for performing the respective operations, or the PPI stage 504 can modify the design layout 502 provided by these stages. After the design layout 502 meets the criteria of the analysis and simulations in various stages of FIG. 1 and is determined to fulfill the design requirements in stage 180 of FIG. 1, a design layout 512 incorporating the PPI scheme is thus obtained.

In some embodiments, the PPI stage 504 includes a delay benefit evaluation stage 506 and a resource estimation stage 508. The delay benefit evaluation stage 506 is discussed with reference to FIGS. 6 and 7.

Figure 6:
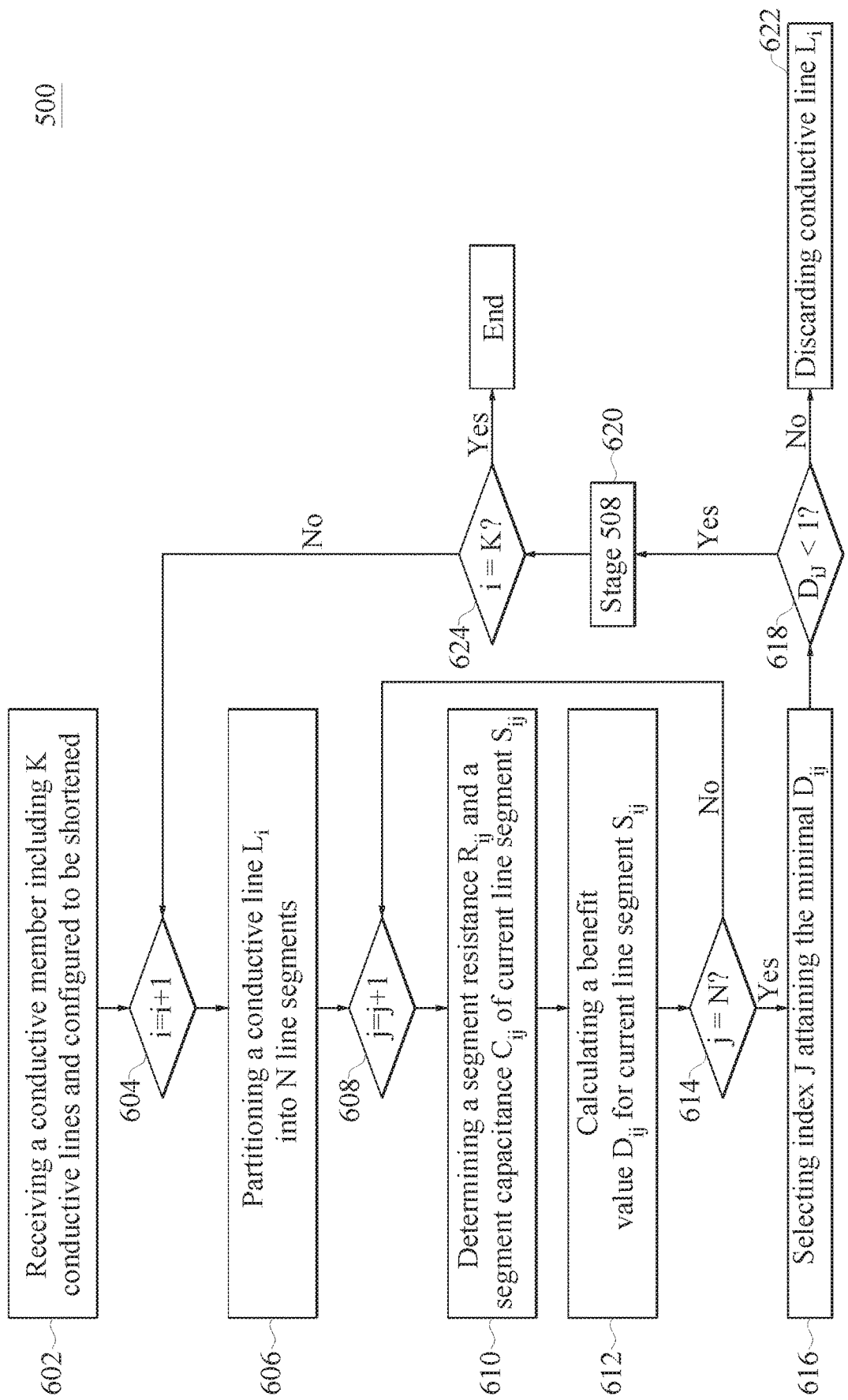
FIG. 6 is a flowchart of a method of delay benefit evaluation, in accordance with some embodiments.

FIG. 6 is a flowchart of a method 600 of the delay benefit evaluation stage 506, in accordance with some embodiments. Additional steps can be provided before, during, and after the steps shown in FIG. 6, and some of the steps described below can be replaced or eliminated in other embodiments of the method 600. The order of the steps may be interchangeable.

At step 602, a conductive member 230 is received including K conductive lines $L_i$ (e.g., K=2 for the second conductive line 234 and the seventh conductive line 402) and configured to be shortened. (FIG. 7 is a schematic diagram of determining the reduced lengths of the conductive lines $L_i$ (e.g., the conductive lines 234 and 402), in accordance with some embodiments.)

Referring to FIG. 6, initially, the index i is reset as i=0. At step 604, the index i is set as i=i+1, i.e., i=1. In the subsequent operations, step 606 through step 616 are executed to determine the length of each of the selected conductive lines $L_i$ configured to be shortened.

Figure 7:
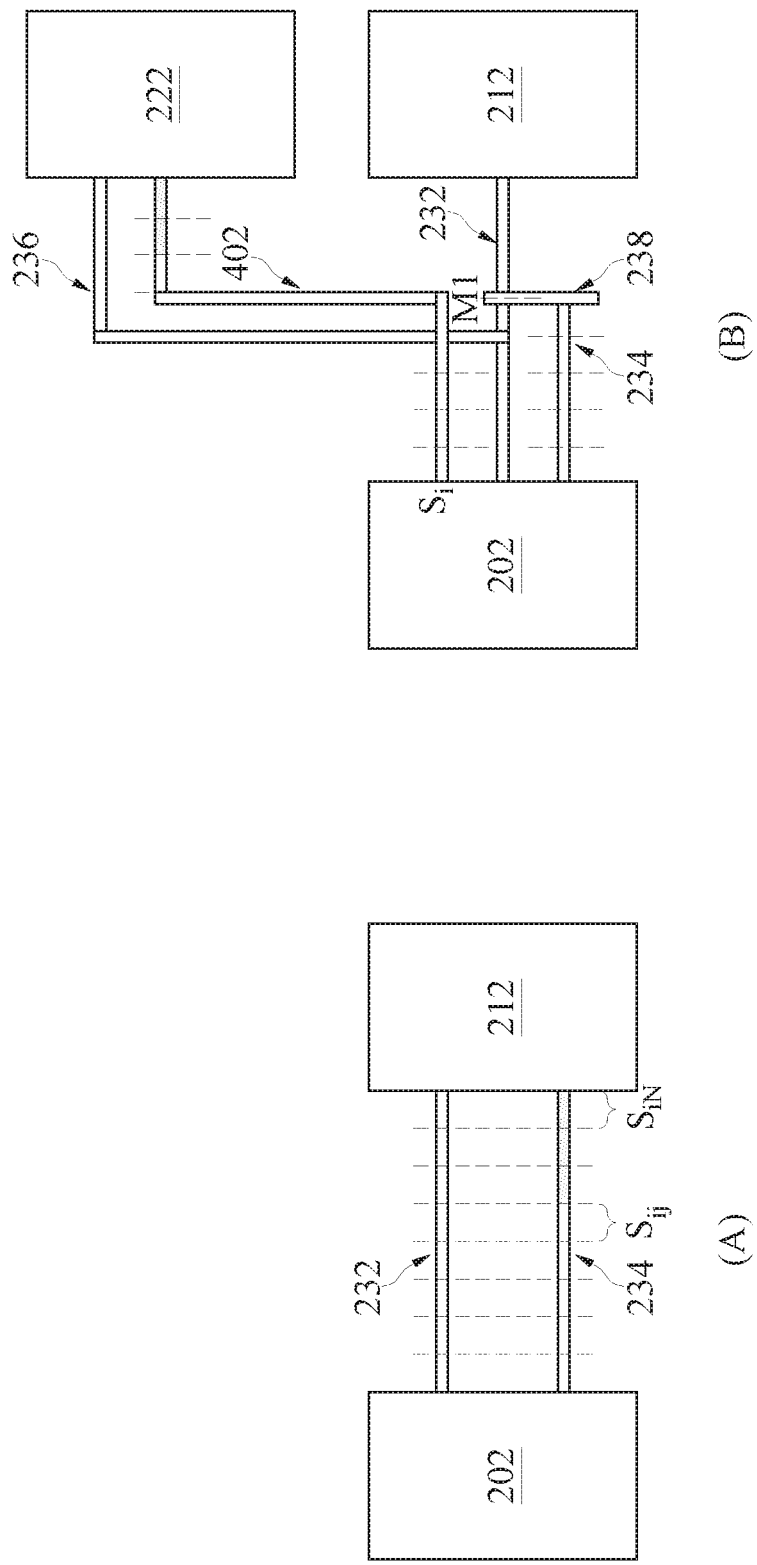
FIG. 7 is a schematic diagram of a shortened conductive line, in accordance with some embodiments.

At step 606, also referring to diagram (A) of FIG. 7, the conductive line $L_1$ (e.g., referring to the second conductive line 234) is partitioned into N line segments $S_{ij}$, where 1<=j<=N. In some embodiments, the length of each line segment $S_{ij}$ is determined according to the design requirements. A greater value of N will lead to a more accurate estimation of the delay benefit at the cost of higher computational demand. In the beginning of the loop between step 606 through step 616 for each conductive line index i, the line segment index j is reset as j=0.

At step 608, the line segment index j is set as j=j+1. At step 610, a segment resistance and a segment capacitance of the current line segment $S_{ij}$ are determined. In some embodiments, an updated segment resistance $P_{ij}$ is determined due to the presence of the current line segment $S_{ij}$ and another conductive line that is paired thereto (e.g., the first conductive line 232) for forming a PPI layout. In some embodiments, an updated segment capacitance $Q_{ij}$ is determined by considering the coupled capacitance between the current line segment $S_{ij}$ and ground or between the current line segment $S_{ij}$ and nearby conductive features (including those in the same layer and different layers) in the electronic circuit 200 or neighboring circuits.

In some embodiments, the introduction of the current line segment $S_{ij}$ leads to reduction of the total resistance and increase of the total capacitance of the paired conductive lines (e.g., the conductive lines 232 and 234). In some embodiments, the updated segment resistance is expressed as $P_{ij}=r_{ij}R_{ij}$, where $R_{ij}$ denotes an original resistance contributed solely by the original conductive line (e.g., the first conductive line 232) and the resistance ratio $r_{ij}$ denotes a ratio between the updated resistance $P_{ij}$ and $R_{ij}$. The updated segment resistance is obtained by taking into account the current line segment $S_{ij}$ of the conductive line $L_i$ and the original resistance. In some embodiments, the resistance ratio $r_{ij}$ is a positive number less than or equal to one, indicating the resistance reduction. In some embodiments, the updated segment capacitance is expressed as $Q_{ij}=c_{ij}C_{ij}$ where $C_{ij}$ denotes an original capacitance contributed solely by the original conductive line (e.g., the first conductive line 232) and the capacitance ratio $c_{ij}$ denotes a ratio between the updated capacitance $Q_{ij}$ and $C_{ij}$. The updated segment capacitance is obtained by taking into account the current line segment $S_{ij}$ of the conductive line $L_i$ and all preceding line segments In some embodiments, the capacitance ratio $c_{ij}$ is a positive number greater than or equal to one, indicating the increase in capacitance.

In some embodiments, the resistance ratio $r_{ij}$ is a function of solely the two parallel conductive lines considered in the PPI scheme. In some embodiments, the capacitance ratio $c_{ij}$ is a function of the layout contexts surrounding the shortened conductive line $L_i$, and may include the capacitance contributed by the output pin 204 of the first cell 202 and the input pins 214 and 224 of the second cell 212 and the third cell 222, respectively. In some embodiments, the values of the resistance ratio $r_{ij}$ and the capacitance ratio $c_{ij}$ depend upon the merging configurations of the conductive member 230, e.g., the various configurations in FIGS. 2B and 3B. In some embodiments, the resistance ratio $r_{ij}$ and the capacitance ratio $c_{ij}$ depend upon the various connection configurations between the non-shortened conductive lines and the shortened conductive lines, e.g., the configurations in FIGS. 4A and 4B.

At step 612, a delay benefit value $D_{ij}$ is calculated through a benefit function F for the current line segment $S_{ij}$. The benefit function F is formed by considering the current line segment $S_{ij}$ and all preceding line segments between the first cell 202 and the current line segment $S_{ij}$ and can be expressed as the following equation (1).

$$D_{ij} = F(S_{ij}) = \frac{\sum_{k=1}^{j} r_{ik} R_{ik} \cdot c_{ik} C_{ik}}{\sum_{k=1}^{j} R_{ik} \cdot C_{ik}} \tag{1}$$

Equation (1) is derived based on the Elmore delay model, and thus expresses the extent of improvement of the RC delay given the line segment $S_{ij}$. Referring to diagram (A) of FIG. 7, the denominator of the benefit function F represents the composite RC delay contributed by the conductive line 232 having a length ending at the current line segment $S_{ij}$. The numerator of the benefit function F represents the composite RC delay contributed by the conductive line 232 in combination with the conductive line 234, both having lengths ending at the line segment $S_{ij}$. It can be understood that in equation (1) the delay benefit value $D_{ij}$ is obtained by accumulating the overall individual delay benefits provided by the line segments $S_{i1}$ through $S_{ij}$ through incrementing the index k from 1 through j.

At step 614, it is determined whether all of the delay benefit values $D_{ij}$ are calculated for each line segment $S_{ij}$. If not, the method 600 loops back to step 608 and sets j=j+1 and performs steps 610 and 612.

If it is determined that all of the delay benefit values $D_{ij}$ are obtained for each line segment $S_{ij}$, the method 600 proceeds with step 616, in which an index J is selected such that the associated delay benefit value $D_{i,J}$ attains the minimal value among the obtained delay benefit values $D_{ij}$. Given the selected index J, the length $G_i$ of the shortened conductive line $L_i$ is temporally determined to include the line segments $S_{i1}$ through $S_{i,J}$ and end at the line segment $S_{i,J}$.

Referring to diagram (B) of FIG. 7, the merging point M1 of the first conductive line 232 is temporally determined at a location aligned with the end point of the line segment $S_{i,J}$ closer to the second cell 212. The length of the conductive line $L_i$ and the merging point for the conductive member 230 are thus determined.

At step 618, it is determined whether the minimal delay benefit value $D_{i,J}$ provides a benefit of net delay reduction, i.e., $D_{i,J}<1$. If affirmative, the method 600 proceeds with step 620, in which the resource estimation stage 508 is performed. If it is determined that $D_{i,J}>=1$, it means that the proposed PPI scheme fails to provide delay advantage, and the current conductive line $L_i$ is discarded from the PPI scheme at step 622.

In another embodiment, the index J attaining the minimal delay benefit value $D_{ij}$ is determined in a simplified manner. In the operation of step 606 through step 616, the delay benefit value $D_{ij}$, once obtained, is compared to the previous delay benefit value, i.e., $D_{i(j-1)}$. Subsequently, it is determined whether the delay benefit value increases or decreases, i.e., whether $D_{ij}<D_{i(j-1)}$. If the current line segment is the first segment $S_{i1}$, it is determined whether $D_{ij}<1$.

If it is determined that the benefit delay value $D_{ij}$ is greater than the previous delay benefit value, i.e., $D_{i(j-1)}$, then the current line segment $S_{ij}$ will not reduce the composite RC delay of the conductive member 230. In such case, the method 600 will select index J−1 as the index attaining the local minimal value of the delay benefit values $D_{ij}$. The length of the shortened conductive line $L_i$ is determined to include the line segments $S_{i1}$ through $S_{i(j-1)}$ and end at the line segment $S_{i(j-1)}$. The method 600 then proceeds with step 618 without calculating the remaining delay benefit values $D_{ij}$ for j>J.

If it is determined that that the delay benefit value $D_{ij}$ contributed by the current line segment $S_{ij}$ is less than the benefit value $D_{i(j-1)}$, then the current line segment $S_{j}$, reduces the composite RC delay of the conductive member 230. The method 600 continues with the next line segment $S_{i(j+1)}$ and performs the comparison between the delay benefit values $D_{i(j+1)}$ and $D_{i(j)}$ until it is found that the delay benefit value is increased at a certain line segment, say $S_{ih}$. In such case, the length of the shortened conductive line L; is determined to at least include the line segments $S_{i1}$ through $S_{ih}$ and end at the line segment $S_{ih}$.

The abovementioned alternative approach of searching for a local minimal delay benefit value $D_{ij}$ provides a feasible solution to the PPI scheme while effectively reducing the required computational resource and time.

Figure 8:
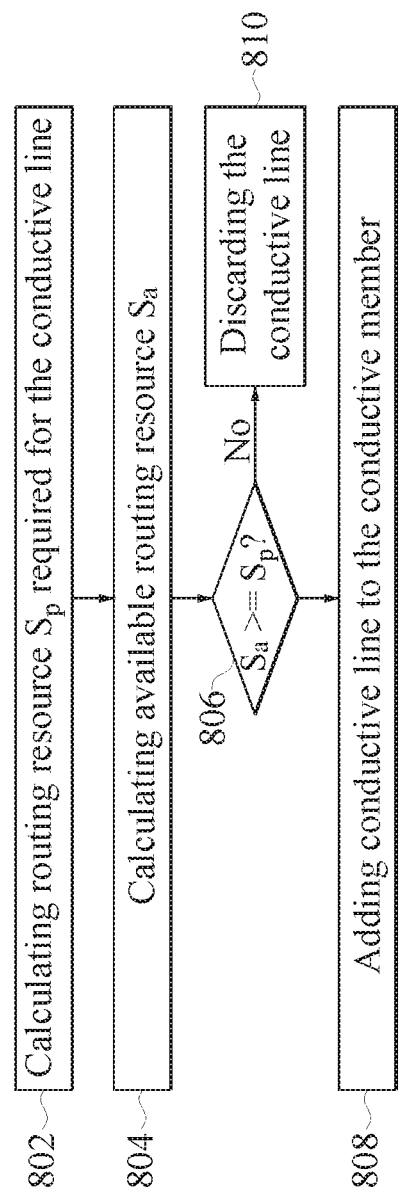
FIG. 8 is a flowchart of a method of resource estimation, in accordance with some embodiments.

FIG. 8 is a flowchart of a method 800 of performing the resource estimation stage 508, in accordance with some embodiments. Additional steps can be provided before, during, and after the steps shown in FIG. 8, and some of the steps described below can be replaced or eliminated in other embodiments of the method 800. The order of the steps may be interchangeable.

At step 802, an amount of routing resource $S_p$ required for the shortened conductive line $L_i$ is calculated. The routing resource $S_p$ may include the routing area of the shortened conductive line $L_i$ with the reduced length $G_i$ and other necessary features accompanying the conductive line $L_i$. At step 804, an amount of available routing resource $S_a$ of the design layout 502 is calculated. At step 806, it is determined whether the available routing area $S_a$ is enough for the PPI scheme, i.e., whether $S_a>=S_p$.

If it is determined that $S_a>=S_p$, at step 808, the conductive line $L_i$ is added to the conductive member to form a shortened parallel-wiring interconnection for the conductive member 230. For example, the second conductive line 234 is electrically connected to the first conductive line 232 at the merging point M1 of the first conductive line 232. In some embodiments, the design layout 502 in FIG. 5 is revised in the placement and routing stage 150 in response to the determination that the second conductive line 234 having a length $G_2$ is to be electrically connected to the first conductive line 232. Otherwise, if it is determined that $S_a<S_p$, then the shortened conductive line $L_i$ is discarded at step 810 and the layout of the conductive member 230 is not altered.

Referring back to FIG. 6, at step 624, it is determined whether all of the conductive lines configured to be shortened are exhausted, i.e., whether i=K. If there are other conductive lines remaining to be checked, the method 600 proceeds with step 604 in which the index i is set as i=i+1, i.e., i=2 (e.g., referring to the seventh conductive line 402 in diagram (B) of FIG. 7) and proceeds between step 606 and 612 to determine the merging point M2 of the third conductive line 236 in FIG. 4A. In some embodiments, the delay benefit value $D_{ij}$ of the conductive line $L_2$ (the seventh conductive line 402) is calculated by considering the presence of the conductive line $L_1$ (i.e., second conductive line 234) if the shortened conductive line $L_1$ is selected.

Figure 9:
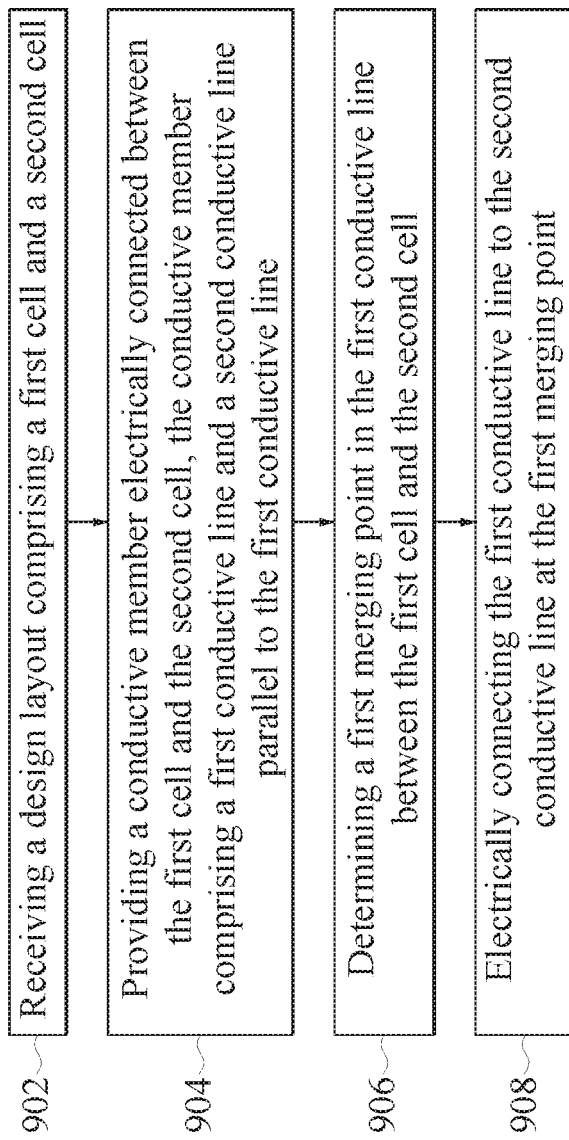
FIG. 9 is a flowchart of a method of determining a merging point of a conductive member, in accordance with some embodiments.

FIG. 9 is a flowchart of a method 900 of determining a merging point of a conductive member, in accordance with some embodiments. Additional steps can be provided before, during, and after the steps shown in FIG. 9, and some of the steps described below can be replaced or eliminated in other embodiments of the method 900. The order of the steps may be interchangeable.

At step 902, a design layout comprising a first cell and a second cell is received. At step 904, a conductive member electrically connected between the first cell and the second cell is provided, wherein the conductive member comprises a first conductive line and a second conductive line parallel to the first conductive line.

At step 906, a first merging point in the first conductive line is determined between the first cell and the second cell. At step 908, the first conductive line is electrically connected to the second conductive line at the first merging point.

FIG. 10 is a schematic diagram of a system 1000 for implementing the lithography methods discussed above, in accordance with some embodiments. The system 1000 includes a processor 1001, a network interface 1003, an input and output (I/O) device 1005, a storage device 1007, a memory 1009, and a bus 1008. The bus 1008 couples the network interface 1003, the I/O device 1005, the storage device 1007, the memory 1009 and the processor 1001 to each other.

The processor 1001 is configured to execute program instructions that include a tool configured to perform the method as described and illustrated with reference to figures of the present disclosure. Accordingly, the tool is configured to execute steps, such as providing design specifications, generating or revising design layout data, and performing the PPI scheme.

The network interface 1003 is configured to access program instructions and data accessed by the program instructions stored remotely through a network (not shown).

The I/O device 1005 includes an input device and an output device configured for enabling user interaction with the system 1000. In some embodiments, the input device includes, for example, a keyboard, a mouse, and other devices. Moreover, the output device includes, for example, a display, a printer, and other devices.

The storage device 1007 is configured for storing program instructions and data accessed by the program instructions. In some embodiments, the storage device 1007 includes a non-transitory computer-readable storage medium, for example, a magnetic disk and an optical disk.

The memory 1009 is configured to store program instructions to be executed by the processor 1001 and data accessed by the program instructions. In some embodiments, the memory 1009 includes any combination of a random access memory (RAM), some other volatile storage device, a read-only memory (ROM), and some other non-volatile storage device.

According to an embodiment, a method includes: receiving a design layout including a first cell and a second cell; providing a conductive member electrically connected between the first cell and the second cell, the conductive member including a first conductive line and a second conductive line parallel to the first conductive line; determining a first merging point in the first conductive line between the first cell and the second cell; and electrically connecting the first conductive line to the second conductive line at the first merging point.

According to an embodiment, a system is provided, wherein the system includes a processor and one or more programs including instructions which, when executed by the processor, cause the system to: receive a design layout including a first cell and a second cell; provide a conductive member electrically connected between the first cell and the second cell, the conductive member including a first conductive line and a second conductive line parallel to the first conductive line; determine a first merging point in the first conductive line between the first cell and the second cell; and electrically connect the first conductive line to the second conductive line at the first merging point.

According to an embodiment, a design layout of a portion of a semiconductor device is provided, wherein the design layout is stored in a non-transitory computer-readable storage medium and includes: a first cell and a second cell adjacent to the first cell, and a conductive member connected to the first cell and the second cell. The conductive member includes a first conductive line and a second conductive line parallel to the first conductive line, wherein the first conductive line has a first length and the second conductive line has a second length less than the first length, and a third conductive line extending in a direction perpendicular to a direction in which the first conductive line extends, wherein the third conductive line couples the first conductive line to the second conductive line.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    receiving a design layout comprising a first cell and a second cell;
    providing a conductive member electrically connected between the first cell and the second cell, the conductive member comprising a first conductive line and a second conductive line parallel to the first conductive line;
    determining a first merging point in the first conductive line between the first cell and the second cell; and
    electrically connecting the first conductive line to the second conductive line at the first merging point,
    wherein the determining of the first merging point in the first conductive line between the first cell and the second cell comprises:
    partitioning the second conductive line into a plurality of line segments;
    calculating a plurality of delay benefit values for each of the line segments; and
    selecting a first line segment attaining a minimal delay benefit value among the plurality of delay benefit values.

2. The method according to claim 1, further comprising manufacturing a semiconductor device according to the design layout.

3. The method according to claim 1, wherein the first merging point is determined such that a minimal time delay between the first conductive line and the second conductive line is achieved.

4. The method according to claim 1, wherein providing a conductive member further comprises providing a third conductive line having a first end connected to the first merging point of the first conductive line and a second end connected to the second conductive line.

5. The method according to claim 4, wherein the third conductive line is formed in a same layer as that in which the first conductive line and the second conductive line reside.

6. The method according to claim 1, wherein the design layout further comprises a third cell, wherein providing a conductive member further comprises:
    providing a fourth conductive line parallel to the first conductive line and electrically connected to the third cell; and
    providing a fifth conductive line perpendicular to the first conductive line and electrically connected between the first conductive line and the fourth conductive line.

7. The method according to claim 6, wherein the fifth conductive line is connected to the first conductive line at a second merging point between the first merging point and the second cell.

8. The method according to claim 6, wherein the fifth conductive line is disposed in a layer different from a layer in which the fourth conductive line is disposed.

9. The method according to claim 1, wherein the second conductive line is determined to extend from a second line segment of the second conductive line contacting the first cell and to terminate at the first line segment.

10. The method according to claim 9, wherein determining a first merging point in the first conductive line between the first cell and the second cell further comprises determining whether a routing resource of the design layout is enough for a length of the second conductive line.

11. The method according to claim 10, further comprising performing a placement and routing operation on the design layout by electrically connecting the second conductive line to the first conductive line in response to the routing resource being determined to be enough for the second conductive line.

12. The method according to claim 1, wherein both the first conductive line and the second conductive line are electrically connected to the first cell.

13. A system, comprising a processor and one or more programs including instructions which, when executed by the processor, cause the system to:
receive a design layout comprising a first cell and a second cell;
provide a conductive member electrically connected between the first cell and the second cell, the conductive member comprising a first conductive line and a second conductive line parallel to the first conductive line;
determine a first merging point in the first conductive line between the first cell and the second cell, comprising:
partition the second conductive line into a plurality of line segments;
calculate a first delay benefit value and second delay benefit value for two adjacent line segments; and
determine whether the first delay benefit value is greater than the second delay benefit value; and
electrically connect the first conductive line to the second conductive line at the first merging point.

14. The system according to claim 13, wherein the instructions of calculating the first delay benefit value and the second delay benefit value, when executed by the processor, further cause the system to calculate an updated resistance and an updated capacitance associated with each of the first and second delay benefit values.

15. The system according to claim 13, wherein the instructions of providing a conductive member, when executed by the processor, further cause the system to provide a third conductive line electrically coupling the first conductive line to the second conductive line, wherein the third conductive line is arranged in a layer different from a layer of the first conductive line and the second conductive line.

16. The system according to claim 13, wherein the instructions of providing a conductive member, when executed by the processor, further cause the system to provide a third conductive line electrically coupling the first conductive line to the second conductive line, wherein the third conductive line is arranged in a layer same as a layer of the first conductive line and the second conductive line.

17. A design layout of a portion of a semiconductor device, wherein the design layout is stored in a non-transitory computer-readable storage medium and comprises:
a first cell and a second cell adjacent to the first cell; and
a conductive member connected to the first cell and the second cell, wherein the conductive member comprises:
a first conductive line and a second conductive line parallel to the first conductive line, wherein the first conductive line has a first length and the second conductive line has a second length less than the first length; and
a third conductive line extending in a direction perpendicular to a direction in which the first conductive line extends, wherein the third conductive line couples the first conductive line to the second conductive line, wherein the third conductive line is arranged in a same layer as that in which the first conductive line and the second conductive line reside.

18. The design layout according to claim 17, wherein the second conductive line has a first end connected to the first cell and a second end connected to the first conductive line through the third conductive line at a first merging point of the first conductive line.

19. The design layout according to claim 17, wherein the conductive member further comprises a first conductive via coupling the first conductive line to the third conductive line and a second conductive via coupling the second conductive line to the third conductive line.

20. The design layout according to claim 17, wherein the conductive member further comprises:
a fourth conductive line parallel to the first conductive line; and
a fifth conductive line perpendicular to the fourth conductive line and coupling the first conductive line to the fourth conductive line, wherein the fifth conductive line has a third end coupled to a second merging point of the first conductive line through the fourth conductive line.

* * * * *